Patented July 28, 1936

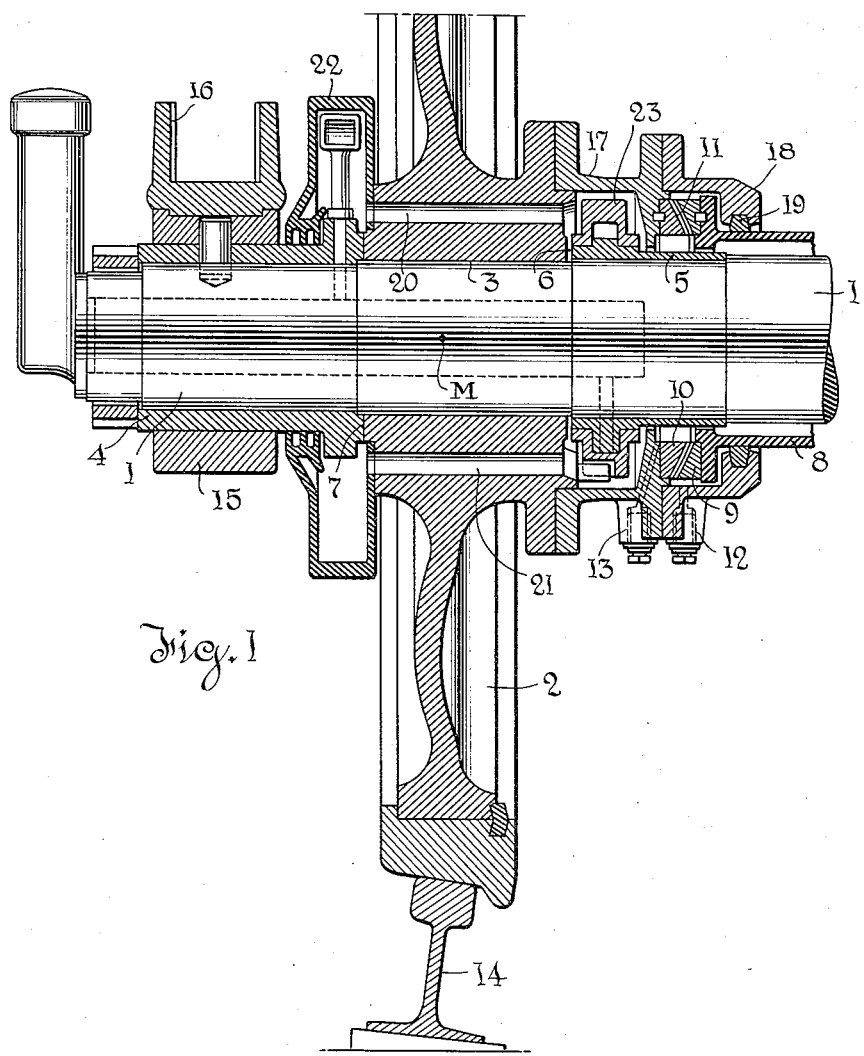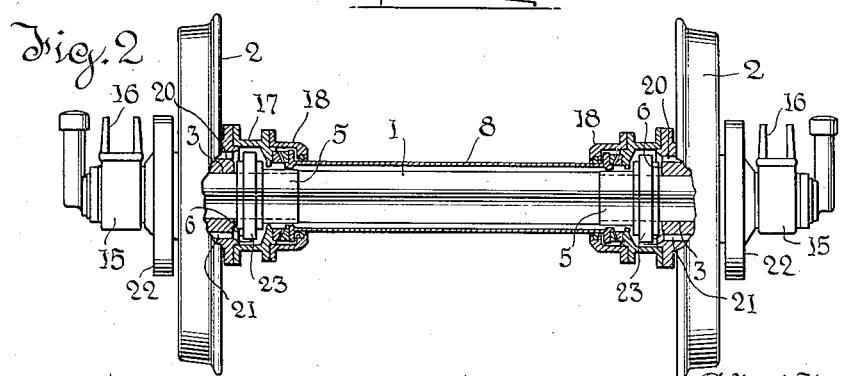

2,049,118

UNITED STATES PATENT OFFICE 2,049,118

WHEEL MOUNTING FOR RAIL VEHICLES

Albert Huguenin, Zurich, Switzerland

Application January 31, 1935, Serial No. 4,387
In Switzerland February 6, 1934

7 Claims. (Cl. 295—36)

This invention relates to a loose wheel unit for rail vehicles, the wheels of which are capable of a relative rotation when running around curves. The object of the invention is to prevent with such a wheel unit a cramping of parts when the axle deflects under the influence of the weight bearing upon the same so that friction losses and wear and tear are reduced to a minimum.

For this purpose there is provided in such a wheel unit, according to the present invention, a spacing tube between the wheels. This tube is freely rotatable and is arranged coaxially with the axle of the unit. The tube bears at its opposite ends against thrust bearings which are provided on the inner ends of the hubs of respective wheels.

A practical embodiment of the invention is shown in the accompanying drawing, in which,—

Figure 1 is a fragmentary longitudinal axial section through the left end of the fixed axle of the unit, showing a portion of the wheel.

Figure 2 shows on a smaller scale, partly in section and partly in elevation, the fixed axle and the two wheels of the unit which are loosely mounted on the axle, as well as the spacing tube which is interposed between said wheels.

1 indicates the fixed axle of a loose wheel unit and 15 a sleeve which carries the spring member 16 of a well known type. Two wheels 2 are rotatably mounted on the axle 1. 3 indicates the bearing surface between each wheel 2 and the axle 1. The bearing surfaces 3 are automatically lubricated when running. The means adopted for that purpose will not be fully dealt with herein because they have no bearing on the gist of the present invention.

4 and 5 indicate non-rotating bushings which are mounted on the axle 1 on both sides of the wheel 2. Only the outer end 7 of the hub of each loose wheel 2 is used for determining the axial outer positions of the wheel. For this purpose, the outer end 7 of the hub serves as a thrust bearing engaging the inner end of the corresponding bushing 4. A spacing member is interposed between the two wheels 2 of each axle 1. According to the constructional form shown in the drawing, the said spacing member is designed as a tube 8 which is arranged coaxially with and freely encircling the axle 1 of the unit. The said tube bears at both ends against spherical thrust bearings which are provided on the inner ends of the hubs of the wheels 2. Each of these thrust bearings includes a concave bearing ring 9 which is rigidly secured to the tube 8 and a bearing ring 10 having a mating convex spherical surface 11 mounted on the loose wheel 2. The center of the spherical surface 11 coincides with the center M of the wheel 2, i. e., on the axis of rotation and substantially in the median plane of the wheel. As a result of this construction the spacing member is supported by the wheels, and being out of contact with the axle, is self-aligning.

The ring 10 is connected with the corresponding wheel 2 by an annular member 17 in such a manner that it rotates with the latter but permits slight tilting movements of this wheel 2 when the axle 1 deflects under the influence of the load upon the same. The two rings 9, 10, of each thrust bearing allow relative rotation of the members 2 and 8; consequently, the tube 8 is freely rotatable between the wheels 2 of the unit. A guard ring 18 carried by member 17 encloses the bearing rings 9 and 10 and carries a dust-guard 19 which engages tube 8.

12 (Figure 1) indicates means for enabling lubricant, preferably grease, to be fed to the thrust bearing rings 9, 10. 13 is a similar means for feeding preferably a heavy viscous grease in order to prevent the oil which lubricates the surfaces 3, from flowing away into the spacing tube 8.

The spacing tube 8 is of such length that after the parts above described have been assembled, the outer hub end 7 of each wheel 2 bears against the inner end of the adjacent bushing 4, so that the axial outer positions of the loose wheels 2 are determined. However, there is clearance 6, at the inner side of each wheel 2 between the hub of the latter and the corresponding bushing 5. Hence no friction is produced at the inner end of the wheel hub.

Since the rails 14 are inclined (say from 1:16 to 1:20) toward the center of the track, axial forces act toward the center of the track on the wheels 2. These axial forces are taken up by the spacing tube 8 and press the rings 9, 10, against each other so that when the two wheels 2 turn at the same speed, the spacing tube 8 rotates with the same angular velocity as the wheels 2. No appreciable friction is then produced on the surfaces 7 which determine the axial outer positions of the wheels 2, nor between thrust bearing rings 9, 10. This arises from the facts that the forces directed toward the center of the track prevent the surfaces 7 from being pressed against their counter-surface more than is necessary to determine the desired position of the wheels 2, and that the rings 9, 10, of the thrust bearings move with the same speed.

On straight track, a practically negligible friction is produced on the surfaces 7 and no friction is produced in the thrust bearings. On curves where the two wheels 2 on an axle 1 rotate differentially, the rings 9, 10 of the thrust bearings move relatively to each other. However, the difference in speed of these members 9, 10, amounts to only a few revolutions per minute so that even on curves, very slight friction is produced in the thrust bearings. Owing to the fact that the thrust bearings are arranged on the inner ends of the hubs of the wheels and the wheels 2 are adapted to tilt relatively to the tube 8 without developing stresses in the spherical thrust bearings, cramping of parts is prevented when the axle 1 is deflected, a point of great importance to the practical utility of the unit.

The parts indicated generally at 20, 21, 22 and 23 have to do with the wheel oiling or lubricating mechanism mentioned as not involved in the present invention. It is to be understood that, as clearly indicated by the cross hatching, the wheel center is continuous from the bearing surface 3, in its hub, to the rim, the rim being illustrated as separately formed, according to known practice.

What is claimed is:—

1. A wheel structure for rail vehicles comprising a pair of independently rotatable axially aligned wheels; means forming a radial bearing and a thrust bearing for each wheel, said radial bearings serving to maintain relative alignment of the wheels and said thrust bearings being arranged to limit the separation of the wheels; and freely rotatable spacing means interposed between and supported by said wheels, said spacing means being angularly displaceable relatively to the respective wheels.

2. The combination defined in claim 1 in which the spacing means is mounted on spherical bearings supported by respective wheels.

3. A wheel structure for rail vehicles comprising in combination an axle; wheels rotatably mounted independently thereon and aligned thereby; thrust bearings limiting the separation of said wheels; and a self-aligning spacing member in thrust relation with said wheels, and freely rotatable relatively to each wheel.

4. A wheel structure for rail vehicles comprising in combination an axle; wheels rotatably mounted independently thereon; thrust bearings limiting the separation of said wheels; a tubular spacing member encircling said axle out of contact therewith; and thrust bearings between said tubular member and each wheel, said thrust bearings permitting relative angular displacement between each wheel and the spacing member.

5. A wheel structure for rail vehicles comprising in combination an axle; wheels rotatably mounted independently thereon; thrust bearings limiting the separation of said wheels; a tubular spacing member encircling said axle out of contact therewith; and spherical thrust bearings between said tubular member and each wheel, each of said spherical bearings being concentric with the axis of rotation of the corresponding wheel.

6. A wheel structure for rail vehicles comprising in combination an axle; wheels rotatably mounted independently thereon; thrust bearings limiting the separation of said wheels; a tubular spacing member encircling said axle out of contact therewith; and spherical thrust bearings between said tubular member and each wheel, the center of each spherical bearing being on the axis of rotation and substantially in the median plane of the corresponding wheel.

7. A wheel structure for rail vehicles comprising in combination a load bearing axle fixed at its ends and having between its ends cylindrical journals; a pair of wheels each freely rotatable on a corresponding one of said journals, said wheels being maintained in alignment by said journals; thrust bearings limiting separation of said wheels; a tubular spacing member encircling said axle out of contact therewith; and thrust bearings between each end of said spacing member and a corresponding wheel, each comprising a spherical concave seat at the end of the member and a mating spherical boss carried by the wheel.

ALBERT HUGUENIN.